United States Patent [19]

Roller

[11] Patent Number: 4,893,111

[45] Date of Patent: Jan. 9, 1990

[54] HEAVY DUTY SOLID STATE FLASHER FOR TURN SIGNAL AND EMERGENCY WARNING LAMPS

[75] Inventor: Philip C. Roller, Ashville, N.Y.

[73] Assignee: Truck-Lite Co., Inc., Falconer, N.Y.

[21] Appl. No.: 301,446

[22] Filed: Jan. 25, 1989

[51] Int. Cl.⁴ ............................................. B60Q 1/46
[52] U.S. Cl. ..................................... 340/471; 315/77; 315/200 A; 340/331; 340/475; 340/431
[58] Field of Search ............... 340/468, 471, 475, 331, 340/431; 307/10.1, 132 V; 200/144 R; 361/211; 315/200 A, 209 R, 77, 217, 225; 337/273

[56] References Cited

U.S. PATENT DOCUMENTS

| | | | |
|---|---|---|---|
| 2,968,024 | 1/1961 | Pearsall | 340/475 |
| 3,229,126 | 1/1966 | Creager | 361/211 |
| 3,246,181 | 4/1966 | Bleiweiss et al. | 340/475 |
| 3,940,657 | 2/1976 | Kasiewicz et al. | 340/475 |
| 4,673,928 | 6/1987 | Guim | 340/331 |
| 4,816,818 | 3/1989 | Roller | 340/431 |

Primary Examiner—Joseph A. Orsino
Assistant Examiner—Brent A. Swarthart
Attorney, Agent, or Firm—Mason, Fenwick & Lawrence

[57] ABSTRACT

A solid state flasher for plural turn signal and emergency warning lamps for trucks or the like, capable of flashing very heavy loads with small voltage drop without contact arching and pitting, including a cylindrical cup-shaped housing can, a dielectric disc-shaped closure wafer closing and sealing the open end of the can, an input terminal/heatsink member in the form of a cylindrical tubular metallic shell axially spanning the can having a contact prong projecting through a slot in the closure wafer, an output terminal member of generally rectangular shape adjacent and paralleling the wafer and including a contact prong extending through another wafer slot, and a circuit board assembly having a solid state flasher circuit thereon supported inwardly parallel to the output terminal member.

17 Claims, 3 Drawing Sheets

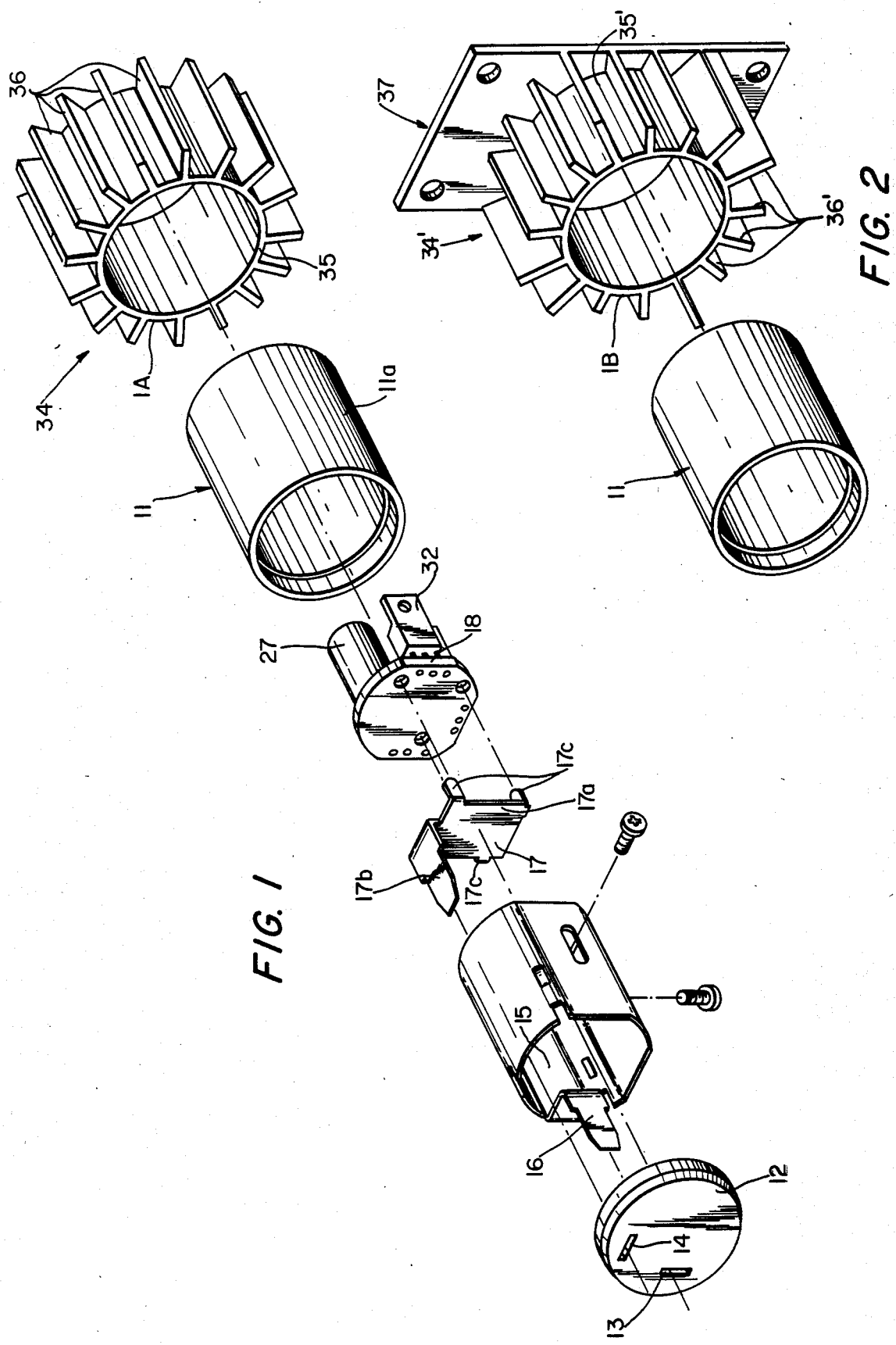

HEAVY DUTY SOLID STATE FLASHER FOR TURN SIGNAL AND EMERGENCY WARNING LAMPS

BACKGROUND AND OBJECTS OF THE INVENTION

The present invention relates in general to flashers for lamps such as lamps in automotive vehicles, and more particularly to heavy duty flashers for turn signal and emergency warning lamps for vehicles, having very heavy load capability and high reliability.

Heretofore, various types of flashers primarily adapted for use in automotive vehicles have been available on the market, including bimetal flashers, electromechanical flashers such as "fly-wheel" type flashers and motor driven flashers, various forms of electronically driven relays, and pure electronic devices. The mechanical or bimetal type automotive lamp flashing circuits typically make and break physical contact alternatively to complete and to interrupt circuits in which they are incorporated. The switches suffer from known defects such as contact pitting, dirtying, and similar problems, and thus often need replacement. Additionally, physical making and breaking of an electrical circuit can cause sparking, which can be dangerous if an accident occurs in which fuel spillage is involved or accidents involving trucks which transport volatile loads.

With the exception of the pure electronic types of flashers, some sort of mechanical switching device has usually been employed to connect the lamp load to the power source. These contacts are prone to arching, which limits the useful life of the flasher, especially when the device has to switch heavy current loads as in the case of semi-trailer trucks which on some occasion may have as many as 16 lamps connected to the flasher.

The electronic flashers presently on the market generally use bipolar transistors, which have too high a voltage drop to be certified to the present U.S. Department of Transportation specification for such devices, or if they do meet the DOT specifications, they are packaged in a large rectangular box and have a large heatsink as an integral part of the package.

An object of the present invention is the provision of a solid state flasher for turn signal and emergency warning lamps for trucks and the like, which avoids the use of relays and electromechanical devices or mechanical switching systems customarily employed in a flasher, but packages the flasher as a solid state structure capable of flashing very heavy loads with a small voltage drop, and having long term reliability. A further object of the present invention is the provision of a novel solid state heavy duty flasher for turn signal and emergency warning lamps for trucks and the like wherein the components are packaged in a typical round can similar to common bimetal flashers, but wherein no ground connection is required and the flasher may be used on both positive and negative ground systems, which are capable of handling extremely high current loads and provide a low voltage drop.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is an exploded perspective view of a solid state flasher assembly for turn signal and emergency warning lamps, constructed in accordance with the present invention;

FIG. 2 is a fragmentary exploded perspective view of the case and circuit board assembly components in association with a modified form of heatsink member, embodying the present invention;

DETAILED DESCRIPTION OF A PREFERRED EMBODIMENT

Figure 3:
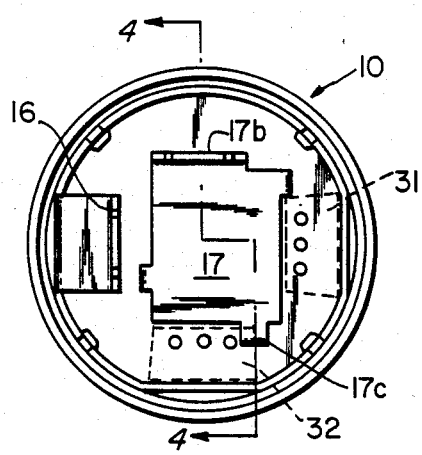
FIG. 3 is an end elevational view of the flasher assembly, with the end closure wafer removed, viewed from the left of FIG. 4.
Figure 4:
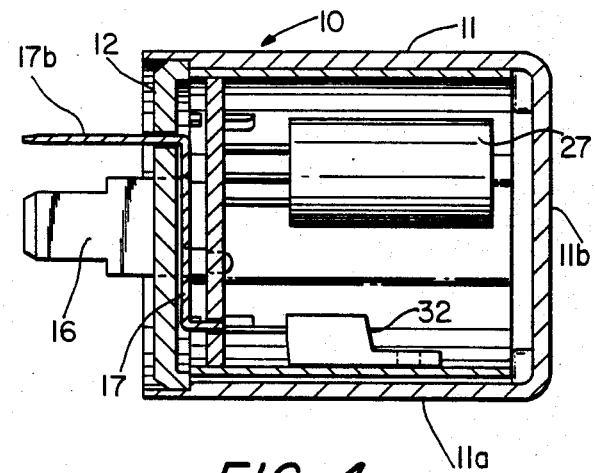
FIG. 4 is a side elevational view of the flasher assembly viewed from the right of FIG. 3 with the case shown in section cut along the section plane 4—4 of FIG. 3.
Figure 5:
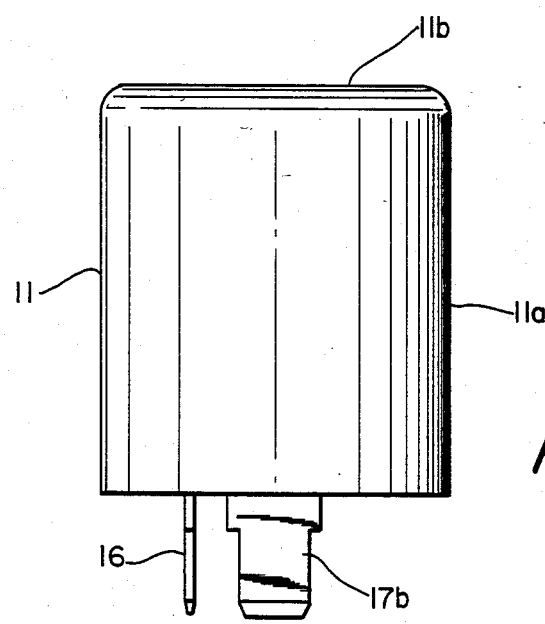
FIG. 5 is a top plan view of the flasher assembly; is a side elevational view of the circuit board
Figure 6:
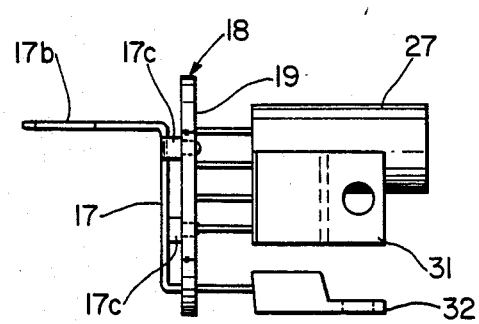
FIG. 6 is a side elevational view of the circuit board attached with the output terminal member, shown removed from the case.
Figure 7:
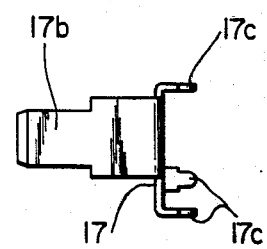
FIG. 7 is a side elevational view of the output terminal member, viewed from above FIG. 3.
Figure 8:
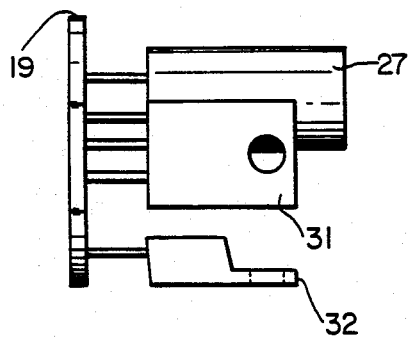
FIG. 8 is a side elevational view of the circuit board assembly.

Referring to the drawings, wherein like reference characters designate corresponding parts throughout the several figures, the solid state flasher of the present invention, indicated generally by the reference character 10, may generally be described as a solid state flasher circuit formed on a printed circuit board basically comprising an astable multivibrator connected to gates of n-channel power MOSFET transistors, with the components packaged in a typical round can similar to the common bimetal flasher. The flasher 10 comprises a generally cylindrical metallic or dielectric plastic case 11 open at one end, as shown in FIGS. 1, 3 and 4, having a cylindrical wall 11a, and a circular bottom wall 11b, defining a can which opens to the left as viewed in FIG. 4. The can or case 11 is closed by a wafer 12 of cylindrical disc-like like shape forming a closure wafer of dielectric material, and is provided with slots 13 and 14 which ar elongated in directions extending at right angles to each other. Within the case 11 and mounted on the closure member wafer 12 is an input terminal heatsink member 15 in the form of a cylindrical tubular metallic shell open at both ends and having an outer diameter conforming to the diameter of the inner surface of the case 11 to slidably fit therein. A generally T-shaped terminal formation extension 16 extends integrally from one edge of the input terminal/heatsink sleeve 15 and is bent inwardly to align the T-shaped terminal formation 16 with the slot 13 of the closure wafer 12 to protrude through the slot 13 to an exposed position forming a contact prong to be engaged with a contact of a socket member or other electrical connection.

An output terminal member indicated at 17 is disposed immediately inwardly of the closure member wafer 12 and comprises a substantially rectangular main body portion 17a having a substantially T-shaped prong formation 17b defining a contact prong extending from one lateral edge to register with and protrude through the other slot 14 of the wafer closure member 12 to engage a socket contact or other electrical conductor forming the output connection from the flasher. Mounting tabs 17c extend in the opposite direction from the top, left side, and bottom edges of the rectangular main body portion 17a, as viewed in FIG. 3, forming mounting supports to extend into slots in the circuit board component of the solid state circuit board assembly 18 for the flasher. The circuit board assembly 18 includes a rigid printed circuit board 19 having the usual wire or prong terminal connections to a timer integrated circuit chip 20, for examples a 555 timer, together with timing resistors 21, 22, charge and discharge diodes 23 24, a timing capacitors 25, a power supply diode 26 and a power capacitor 27. Also mounted on the printed circuit board are a pair of gate resistors 28, 29, a gate protection zener diode 30, and two power MOSFET transistors 31 and 32.

The wafer is assembled by connecting the output terminal member 17 directly to the circuit board assembly 18 and this assembly is snapped into place within the input terminal member 15, and the conventional tabs of the transistors 31, 32 are fastened in the input terminal member 15 with mechanical fasteners. This assembly is positioned within the case 11, the closure member wafer 12 is then slipped over the terminal formations 16 and 17b of the input terminal member 15 and the output terminal member 17, and the edges of the metallic cup shaped case 11 bounding the open end thereof are formed over the wafer closure 12 holding the assembly together. Potting compound may be put into the case 11 in order to improve the reliability of the circuit components by sealing them from moisture and isolating them from mechanical vibration, and improving the heat exchange characteristics of the device.

As previously stated, the power MOSFET transistors 31 and 32 are chosen for high current rating and low ON resistance. Very heavy loads may be flashed, such as, for example, twelve 1156 lamp bulbs, with a voltage drop of less than 0.4 volts as measured at the flasher terminals. The maximum continuous current capability is a function of the number and type of transistor switches used. Units have been tested which have been found to be capable of 100 amps for short periods of time. Because the flasher can handle extremely high current loads, the circuit fuse will blow before damage is incurred. Because of this, no on-board circuit protection is required. The maximum continuous current rating may be increased by adding auxiliary heatsinks.

Two examples of such auxiliary heatsinks are shown in FIGS. 1 and 2. In FIG. 1, the auxiliary heatsink is indicated at 34 and comprises an annular cylindrical inner shell or sleeve portion 36 having an inside diameter corresponding to the outside diameter of the metallic can or case 11 to receive and intimately contact the exterior surface of the can 11, and includes a plurality of thin rectilinear radially projecting fins 36 to increase the effective surface for heat exchange with the surrounding medium, the fins extending a uniform distance radially outwardly from the inner sleeve or shell portion 35 and having an axial extent corresponding to the axial length of the flasher unit, as defined by the can or case 11. An alternate form of heatsink is shown in FIG. 2 and indicated by reference character 34', which also includes an inner cylindrical sheet or sleeve portion 35' like the sleeve 35 of the heatsink embodiment of FIG. 1, and having radially projecting thin rectilinear fins 36' which, however, at one end thereof integrally join a vertical mounting plate 37 having apertures therein for mounting the plate on an appropriate supporting surface. In this embodiment, the radial dimensions of the fins 36' are not uniform, but rather vary progressively so as to extend to and terminate at a rectangular path defined by a pair of horizontal planes at the top and bottom of the heatsink and a pair of parallel vertical planes at the sides of the heatsink, paralleling the vertical and horizontal edges of the plate portion 37.

Figure 9:
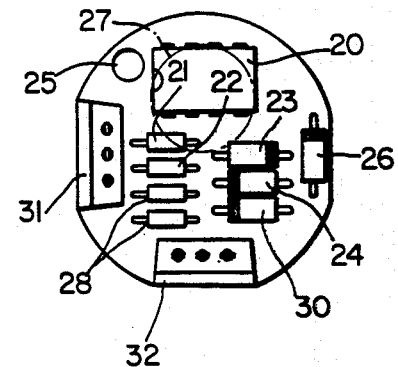
FIG. 9 is a rear elevational view of the circuit board assembly, viewed from the right of FIG. 8.
Figure 10:
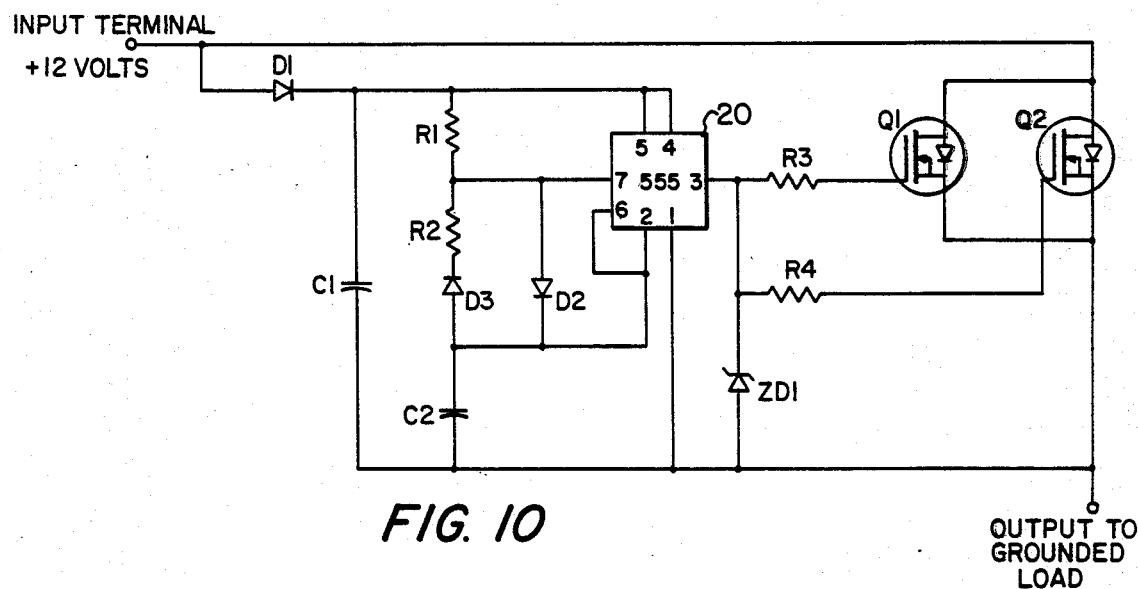
FIG. 10 is a schematic diagram of one electrical circuit for the flasher.

The schematic circuit for the flasher is shown in FIG. 10. Referring to the schematic circuit, the diode D1 and a capacitor C1 (shown at 26 and 27 of FIG. 9) form the power supply for the circuit. The capacitor C1 is charged through the bulb filaments of the lamp bulb being served by the flasher when the lamps are off, and maintains operating currents in the timing circuits during the on portion of the flasher cycle. When the lamps turn off, the charge on the capacitors C1 is replenished. The components R1, R2, D2, D3, and C2, and the timer module or chip 20 form an astable multivibrator with the components values chosen to produce a 50% duty cycle square wave output with a frequency of between 1 and 2 Hz. This output is applied to the gates of the power MOSFET transistors Q1 and Q2 (31 and 32 in FIG. 9) through the resistors R3 and R4. When the output is high, the transistors Q1 and Q2 will turn on applying operating voltage to the associated lamps. When it is low, it will turn off the transistors which in turn turns off the lamps. The Zener diode ZD1 prevents the gate voltage from exceeding the maximum gate voltage.

I claim:

1. A solid state flasher for connection into a circuit path of electrical conduction for plural turn signal and emergency working lamps for a vehicle, capable of flashing very heavy loads with small voltage drop without contact arcing and pitting, comprising a cylindrical cup-shaped housing can having a closed bottom and an opposite open end, a dielectric disc-shaped closure wafer closing and sealing the open end of the can and having a flat inner surface and a pair of prong-receiving slots extending therethrough, an input terminal/heatsink member in the form of a cylindrical tubular metallic shell axially spanning the space between said wafer and said can bottom disposed in said can in thermally conductive engagement with confronting wall portions of said can and having a contact prong formation integrally extending from one end thereof through one of said slots of said wafer, an output terminal member in the form of a thin metal sheet having a generally rectangular main body positioned inwardly adjacent and parallel to said flat inner surface of said wafer and including a contact prong formation extending 20 integrally perpendicularly from a edge thereof through the other of said wafer slots, and a circuit board assembly having a solid state flasher circuit thereon comprising a planiform circuit board supported inwardly parallel to the main body of said output terminal member to be rigidly carried by the input terminal member which in turn is rigidly carried in selected spaced relation to and surrounded by the input terminal member within said can.

2. A solid state flasher as defined in claim 1, wherein said prong-receiving slots of said wafer are arranged with their major dimensions extending perpendicular to each other, and said contact prong formations of said input terminal member and said output terminal member are substantial T-shaped formations defining thin contact blades arranged perpendicular with respect to each other positioned to register with and extend through said wafer slots.

3. A solid state flasher as defined in claim 1, wherein said planiform circuit board of said circuit board assembly is of generally cylindrical disc-like shape having a periphery corresponding substantially to the shape of and inwardly engaging the inwardly facing surface of the cylindrical tubular metallic shell of the input terminal member to receive support therefrom, and said output terminal member having means connecting the same at plural locations to said circuit board.

4. A solid state flasher as defined in claim 2, wherein said planiform circuit board of said circuit board assembly is of generally cylindrical disc-like shape having a periphery corresponding substantially to the shape of and inwardly engaging the inwardly facing surface of the cylindrical tubular metallic shell of the input terminal member to receive support therefrom, and said output terminal member having means connecting the same at plural locations to said circuit board.

5. A solid state flasher as defined in claim 3, wherein said means connecting said output terminal member to said circuit board comprise a plurality of integral tabs projecting from plural edges of said rectangular main body thereof in a direction opposite to said contact prong formation and fractionally interfitting into slots in said circuit board.

6. A solid state flasher as defined in claim 4, wherein said means connecting said output terminal member to said circuit board comprise a plurality of integral tabs projecting from plural edges of said rectangular main body thereof in a direction opposite to said contact prong formation and fractionally interfitting into slots in said circuit board.

7. A solid state flasher as defined in claim 1, wherein said solid state flasher circuit of said circuit board assembly comprises plural solid state transistors and a timer circuit chip forming an astable multivibrator together with associated electronic circuit components all mounted on said circuit board including a power capacitor and power diode arranged to be charged through the bulb filaments of the associated lamp bulbs being served by the flasher and timing resistors and charge and discharge diodes and a timer capacitor associated therewith for turning on and turning off operating voltage to the associated lamps.

8. A solid state flasher as defined in claim 2, wherein said solid state flasher circuit of said circuit board assembly comprises plural solid state transistors and a timer circuit chip forming an astable multivibrator together with associated electronic circuit components all mounted on said circuit board including a power capacitor and power diode arranged to be charged through the bulb filaments of the associated lamp bulbs being served by the flasher and timing resistors and charge and discharge diodes and a timer capacitor associated therewith for turning on and turning off operating voltage to the associated lamps.

9. A solid state flasher as defined in claim 3, wherein said solid state flasher circuit of said circuit board assembly comprises plural solid state transistors and a timer circuit chip forming an astable multivibrator together with associated electronic circuit components all mounted on said circuit board including a power capacitor and power diode arranged to be charged through the bulb filaments of the associated lamp bulbs being served by the flasher and timing resistors and charge and discharge diodes and a timer capacitor associated therewith for turning on and turning off operating voltage to the associated lamps.

10. A solid state flasher as defined in claim 4, wherein said solid state flasher circuit of said circuit board assembly comprises plural solid state transistors and a timer circuit chip forming an astable multivibrator together with associated electronic circuit components all mounted on said circuit board including a power capacitor and power diode arranged to be charged through the bulb filaments of the associated lamp bulbs being served by the flasher and timing resistors and charge and discharge diodes and a timer capacitor associated therewith for turning on and turning off operating voltage to the associated lamps.

11. A solid state flasher as defined in claim 5, wherein said solid state flasher circuit of said circuit board assembly comprises plural solid state transistors and a timer circuit chip forming an astable multivibrator together with associated electronic circuit components all mounted on said circuit board including a power capacitor and power diode arranged to be charged through the bulb filaments of the associated lamp bulbs being served by the flasher and timing resistors and charge and discharge diodes and a timer capacitor associated therewith for turning on and turning off operating voltage to the associated lamps.

12. A solid state flasher as defined in claim 6, wherein said solid state flasher circuit of said circuit board assembly comprises plural solid state transistors and a timer circuit chip forming a astable multivibrator together with associated electronic circuit components all mounted on said circuit board including a power capacitor and power diode arranged to be charged through the bulb filaments of the associated lamp bulbs being served by the flasher and timing resistors and charge and discharge diodes and a timer capacitor associated therewith for turning on and turning off operating voltage to the associated lamps.

13. A solid state flasher as defined in claim 1, including an exterior heatsink metallic member comprising an annular cylindrical inner sleeve portion having an inside diameter corresponding to the outside diameter of said cup-shaped housing can to be disposed in intimate thermal transfer contact therewith and including a plurality of thin rectilinear radially outwardly projecting fins extending in radial planes which include the center axis of the inner sleeve for conduction of heat thereto from said input terminal/heatsink member and the surrounding wall portion of said housing can and radiating the same to surrounding ambient medium.

14. A solid state flasher as defined in claim 2, including an exterior heatsink metallic member comprising an annular cylindrical inner sleeve portion having an inside diameter corresponding to the outside diameter of said cup-shaped housing can to be disposed in intimate thermal transfer contact therewith and including a plurality of thin rectilinear radially outwardly projecting fins extending in radial planes which include the center axis of the inner sleeve for conduction of heat thereto from said input terminal/heatsink member and the surrounding wall portion of said housing can and radiating the same to surrounding ambient medium.

15. A solid state flasher as defined in claim 3, including an exterior heatsink metallic member comprising an annular cylindrical inner sleeve portion having an inside diameter corresponding to the outside diameter of said cupshaped housing can to be disposed in intimate thermal transfer contact therewith and including a plurality of thin rectilinear radially outwardly projecting fins extending in radial planes which include the center axis of the inner sleeve for conduction of heat thereto from said input terminal/heatsink member and the surrounding wall portion of said housing can and radiating the same to surrounding ambient medium.

16. A solid state flasher as defined in claim 5, including an exterior heatsink metallic member comprising an annular cylindrical inner sleeve portion having an inside diameter corresponding to the outside diameter of said cupshaped housing can to be disposed in intimate thermal transfer contact therewith and including a plurality of thin rectilinear radially outwardly projecting fins extending in radial planes which include the center axis of the inner sleeve for conduction of heat thereto from said input terminal/heatsink member and the surrounding wall portion of said housing can and radiating the same to surrounding ambient medium.

17. A solid state flasher as defined in claim 7, including an exterior heatsink metallic member comprising an annular cylindrical inner sleeve portion having an inside diameter corresponding to the outside diameter of said cupshaped housing can to be disposed in intimate thermal transfer contact therewith and including a plurality of thin rectilinear radially outwardly projecting fins extending in radial planes which include the center axis of the inner sleeve for conduction of heat thereto from said input terminal/heatsink member and the surrounding wall portion of said housing can and radiating the sam to surrounding ambient medium.

* * * * *